United States Patent [19]

Walter et al.

[11] Patent Number: 5,591,290
[45] Date of Patent: Jan. 7, 1997

[54] METHOD OF MAKING A LAMINATE HAVING VARIABLE ADHESIVE PROPERTIES

[75] Inventors: Peter A. Walter, Schaumburg; Wayne E. Richter, Batavia, both of Ill.

[73] Assignee: Wallace Computer Services, Inc., Hillside, Ill.

[21] Appl. No.: 376,742

[22] Filed: Jan. 23, 1995

[51] Int. Cl.$^6$ .................. B32B 31/16; C09J 5/00
[52] U.S. Cl. .................. 156/152; 156/247; 156/290; 156/344
[58] Field of Search .................. 156/152, 247, 156/249, 289, 290, 344; 428/40, 352, 41.8

[56] References Cited

U.S. PATENT DOCUMENTS

| | | | |
|---|---|---|---|
| 2,303,346 | 12/1942 | Flood | 156/152 |
| 3,051,604 | 8/1962 | Andrews | 156/152 |
| 3,457,137 | 7/1969 | McCarthy | 156/152 |
| 3,503,782 | 3/1970 | Ayres | 117/45 |
| 3,554,835 | 1/1971 | Morgan | 156/234 |
| 3,574,026 | 4/1971 | Kuchek | 156/152 |
| 3,900,642 | 8/1975 | Michel | 428/40 |
| 4,069,077 | 1/1978 | Baumgartner | 156/152 |
| 4,211,809 | 7/1980 | Barta | 428/201 |
| 4,460,634 | 7/1984 | Hasegawa | 428/124 |
| 4,501,772 | 2/1985 | Luxeder | 427/208.6 |
| 4,587,152 | 5/1986 | Gleichenhagen et al. | 428/195 |
| 4,725,468 | 2/1988 | McIntyre | 428/40 |
| 4,880,678 | 11/1989 | Goffi | 428/40 |
| 5,031,938 | 7/1991 | Instance | 283/81 |
| 5,061,535 | 10/1991 | Kreckel et al. | 428/42 |

FOREIGN PATENT DOCUMENTS 1541311  2/1979  United Kingdom .

*Primary Examiner*—Daniel Stemmer
*Attorney, Agent, or Firm*—Roylance, Abrams, Berdo & Goodman, L.L.P.

[57] ABSTRACT

The adhesive bonding strength of a pressure sensitive adhesive on a laminate is selectively modified by applying a discontinuous layer of a non-adhesive material to the pressure sensitive adhesive. Preferably, the laminate is a preformed, label stock, including a label or substrate having a pressure sensitive adhesive on one surface thereof and a release sheet overlying the adhesive. The label is first delaminated from the release sheet to expose the oppositely facing surface of the label and the release sheet. A discontinuous layer of the non-adhesive material is then printed on either the release sheet or the adhesive. The release sheet is relaminated back onto the label to form a modified laminate with new adhesive properties. When the label is then separated from the release layer, the non-adhesive material adheres to the pressure sensitive adhesive to reduce the exposed surface area of the adhesive.

30 Claims, 2 Drawing Sheets

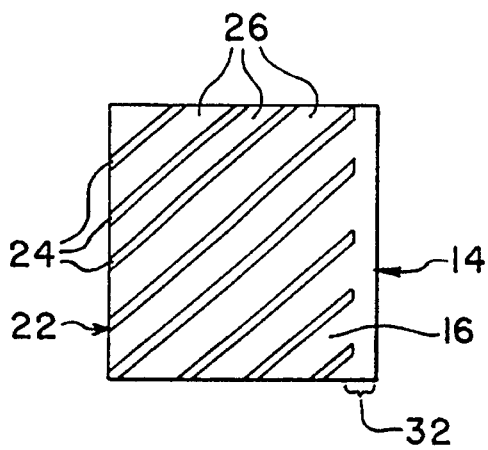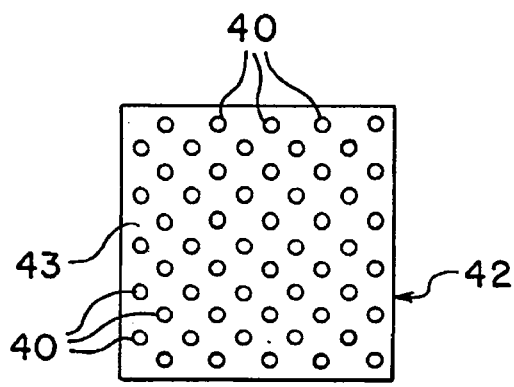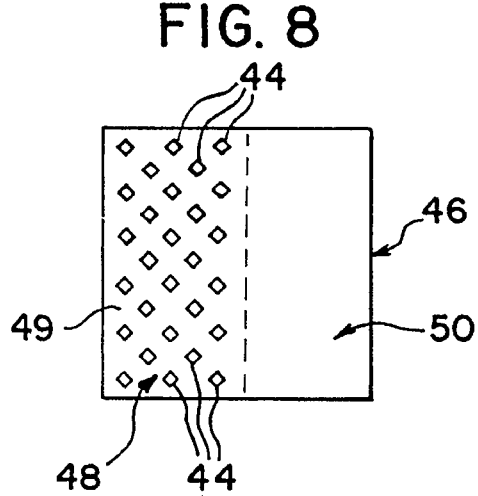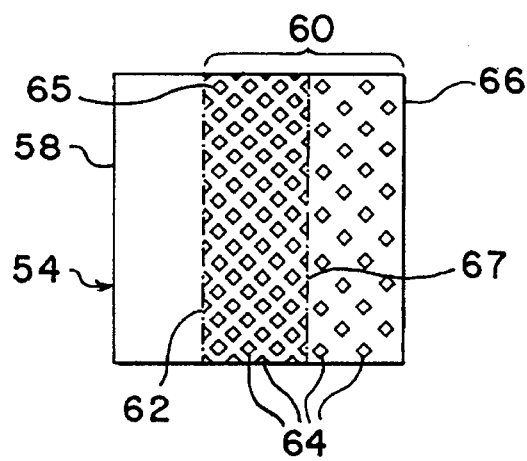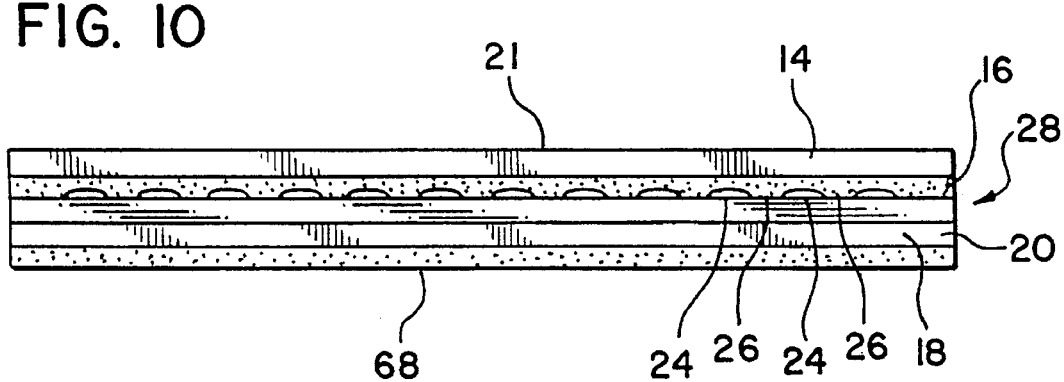

METHOD OF MAKING A LAMINATE HAVING VARIABLE ADHESIVE PROPERTIES

FIELD OF THE INVENTION

The present invention relates to a method of making a pressure sensitive adhesive substrate and to a method of reducing the adhesive bonding strength of a pressure-sensitive adhesive on a substrate. More particularly, the invention is directed to methods of modifying the existing adhesive bonding strength of previously manufactured pressure sensitive label stock.

BACKGROUND OF THE INVENTION

Pressure sensitive adhesives are well-known in the art and commonly used in adhesive systems such as tapes, decals, labels, transparent protective coverings, and the like. The adhesive systems typically comprise a laminate of an article, such as a label or paper tag having a coating of pressure sensitive adhesive on one side thereof, releasably adhered to a release sheet. The release sheet is usually a paper sheet coated or treated with a release material such as a wax or silicone. The release sheet is peelable from the label to expose the adhesive so that the label can be adhered to a supporting surface.

Labels capable of being removed from their applied surface are generally much more expensive than labels intended to bond permanently. In addition, the degree of removability is critical, i.e., too removable and it may fall off, or too permanent and it will not remove cleanly. It is therefore a great advantage if the bonding power of a single low cost adhesive can be tailored by modification to be removable from many different surfaces.

Furthermore, it is of great advantage for some uses to have discrete sections on a label with otherwise permanent adhesive performance to have varying degrees of removable performance. This can only be done now by such methods as coating two adhesives on the same web, laminating two separately coated materials together on the same liner, or coating different coat weights of the same adhesive in stripes to achieve varying performance.

Some articles and sheet materials are designed to be removed from one support surface and reapplied to another support surface. The high bonding power of pressure sensitive adhesives typically do not permit the article to be easily removed. To overcome the high bonding power of the pressure sensitive adhesive, a modified adhesive is used, having reduced tackiness, or the adhesive is replaced with a less tacky adhesive. This type of modification is more expensive than using a standard pressure-sensitive adhesive and makes it difficult to control adhesive bonding power of the adhesive in the finished article.

Several manufacturers have developed methods to control bonding strength of pressure-sensitive adhesives and the force required to separate the article from a support surface. One example as disclosed in British Patent No. 1,541,311, applies a non-continuous layer of beads of a polysiloxane material to a layer of a pressure sensitive adhesive during the initial manufacturing process. The release sheet is then laminated to the article to form a modified laminate that can be removed and repositioned. This system has the disadvantage that adhesive bonding properties of the laminate are determined by the manufacturing process and cannot be selectively modified by the user and cannot be modified subsequent to manufacture.

Another pressure sensitive adhesive system includes release dots on the adhesive material to prevent the adhesive from contacting the support surface. The material is applied to a support surface, and pressure is applied to extrude the adhesive around the dots. An example of this type of adhesive system is disclosed in U.S. Pat. No. 3,554,835 to Morgan. This adhesive system does not permit the article to be removed from the support surface or repositioned once the adhesive makes contact with the support surface.

Other pressure sensitive adhesive systems include a coated release sheet that enables the release sheet to be easily separated from the article. These release sheets may have the release coating applied in a selected pattern or include different release materials having different release properties. Examples of these adhesive systems are disclosed in U.S. Pat. No. 5,061,535 to Krechel et al. and U.S. Pat. No. 3,503,782 to Ayres, respectively.

The previous adhesive systems do not provide a means for modifying the bonding properties of a pressure sensitive adhesive after manufacture of the laminate. Thus, there is a continuing need for a pressure sensitive adhesive system having selected adhesive bonding strength that can be removed and repositioned on a support surface. This invention addresses this need as well as other needs in the art, which will become apparent to those skilled in the art once given this disclosure.

SUMMARY OF THE INVENTION

The present invention is directed to a laminate comprising a substrate having a pressure sensitive adhesive with a controlled adhesive bonding strength on one surface thereof. The invention is further directed to methods of producing a pressure sensitive adhesive laminate and selectively controlling the adhesive bonding strength of the adhesive. In particular, the invention relates to a method of modifying the adhesive bonding strength of a pressure sensitive adhesive in a previously manufactured laminate so that the adhesive-coated substrate is easily separated from the support surface.

One aspect of the invention is to provide a stock laminate assembly comprising a substrate having a coating of a pressure sensitive adhesive and a release sheet, where the bonding strength of the pressure sensitive adhesive coating has been modified. The adhesive bonding strength of the adhesive is modified by covering a portion of the adhesive with a non-adhesive material such as a varnish. In a preferred form of the invention, the non-adhesive material is a uniform discontinuous layer on the adhesive layer. The proportion and specific pattern of the adhesive covered with the non-adhesive material selectively modifies the bonding strength of the adhesive by reducing the exposed surface area of the adhesive and by breaking up the continuous film coverage of the adhesive into a pattern of small discrete areas. The substrate having the adhesive coating is applied to a support surface and can be repositioned or removed without damaging the substrate.

In one aspect of the invention, a method of making the laminate comprises providing a laminate assembly of a substrate having a layer of a pressure sensitive adhesive and a release sheet adhered to the pressure sensitive adhesive, separating the release sheet from the pressure sensitive adhesive on the substrate, applying a discontinuous layer of a non-adhesive material between the separated release sheet and substrate, relaminating the release sheet to the substrate with the discontinuous layer therebetween to modify the adhesive properties of the pressure sensitive adhesive on the substrate.

In a further embodiment, the invention is directed to a method of modifying the adhesive properties of a label assembly having a continuous layer of a pressure sensitive adhesive on one of its sides, and a release sheet adhered to its other side by the pressure sensitive adhesive, wherein the method basically includes the steps of (1) delaminating the label and pressure sensitive adhesive from the release sheet, (2) applying a discontinuous layer of a non-adhesive material between the label and release sheet, and (3) relaminating the label to the release sheet to form a modified label assembly, whereby the non-adhesive material contacts the adhesive of the label to reduce the adhesive bonding properties of the label assembly.

In embodiments of the invention, the non-adhesive material is printed on the release sheet or directly on the adhesive layer. When the non-adhesive material is printed on the release sheet, the material is transferred to the adhesive layer when the layers are relaminated. The discontinuous layer of the non-adhesive material can be printed in the form of spaced-apart dots or lines. The spacing and the dimensions of the dots or lines are selected to determine the bonding strength of the adhesive layer by varying the surface area available for bonding.

Other objects, advantages, and salient features of the present invention will become apparent from the following detailed description, which when taken in conjunction with the annexed drawings, discloses preferred embodiments of the invention.

BRIEF DESCRIPTION OF THE DRAWINGS

Referring now to the drawings which form a part of this original disclosure:

FIG. 6 is a bottom plan view of the adhesive layer and non-adhesive material in a first embodiment;

FIG. 7 is a bottom plan view of the adhesive layer and non-adhesive material of a laminate in accordance with an alternative embodiment of the present invention;

FIG. 8 is a bottom plan view of the label illustrating the adhesive layer and the non-adhesive material applied thereto in accordance with a further embodiment of the present invention;

FIG. 9 is a bottom plan view of the label illustrating the adhesive layer and the non-adhesive material applied thereto in accordance with a further embodiment of the present invention; and FIG. 10 is a side elevational view of a laminate in accordance with a further embodiment of the present invention.

DETAILED DESCRIPTION OF THE INVENTION

Figure 1:
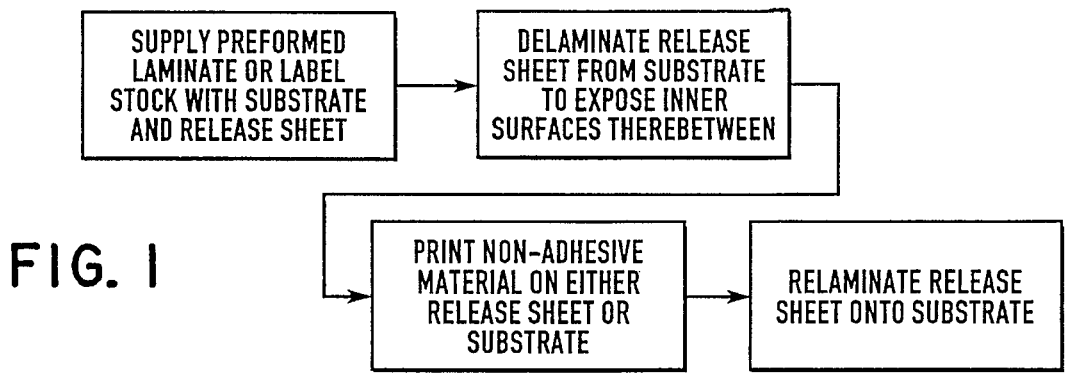
FIG. 1 is a flow diagram of a method of producing a laminate and modifying the adhesive bond strength of a pressure sensitive adhesive in accordance with one embodiment of the invention.

Referring to the drawings, the present invention is directed to a label assembly or laminate 12 including a substrate 14 having a pressure sensitive adhesive coating 16 with a modified adhesive bonding strength. Moreover, the invention is directed to methods of modifying the adhesive bonding strength of a pressure sensitive adhesive coating on the substrate 14.

Referring to the flow diagram of FIG. 1, a substrate having a pressure sensitive adhesive with a modified bonding strength is produced by initially selecting a first laminate. The first laminate includes a substrate having an adhesive coating and a release sheet. The first laminate is then delaminated by separating the release sheet from the substrate to expose the adhesive. A non-adhesive material is applied by printing or padding between the separated layers followed by relamination of the separated layers.

Figure 2:
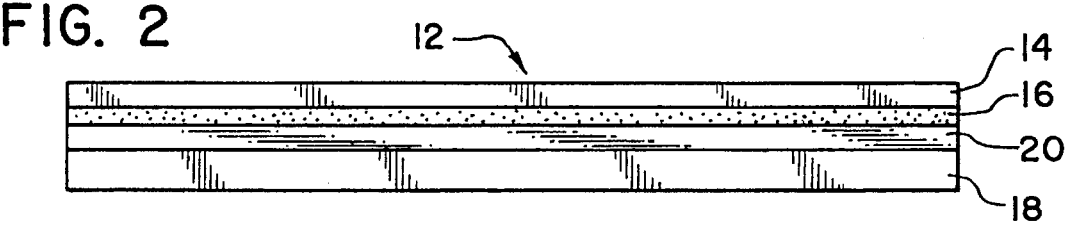
FIG. 2 is a side elevational view of a laminate including an adhesive-backed substrate or label and release sheet for use with the method of FIG. 1 in accordance with one embodiment of the invention.

The first laminate 12 as shown in FIG. 2 includes an outer substrate 14 with a coating layer of a pressure sensitive adhesive 16 on a bottom side thereof, and a release sheet 18 with a release coating 20. Substrate 14 includes an outer surface 21 which defines a printing or writing surface for receiving printed indicia or variable information. Release sheet 18 with release coating 20 is removably adhered to substrate 14 by pressure sensitive adhesive 16. Laminate 12 can be a commercially available pressure sensitive adhesive laminate stock as known in the art. Laminate 12 may be a continuous roll or dimensioned sheet. In further embodiments, release sheet 18 can be a continuous sheet and separate die cut substrates 14 can be spaced along release sheet 18.

As used herein, the term "substrate" refers generally to an adhesive coated article. Typically, the article is a sheet material made of a paper stock such as kraft paper. Alternatively, the article is a rigid or flexible plastic film or metal foil. In preferred embodiments, the article is a flexible stock material suitable for producing preprinted or blank labels with a writing surface thereon for receiving variable information. The article may also be, for example, a transparent plastic film for laminating onto a support surface. Alternatively, the article can be an address label, packing slip, invoice slip or blank business form. The article may be a continuous sheet which can be cut to the desired size by the ultimate user. Alternatively, the articles may be die cut or dimensioned by other cutting means and fixed to a carrier sheet which can be dimension or a continuous sheet. In preferred embodiments, the substrate is a label having pre-printed indicia and/or a writable surface for applying additional variable information.

Pressure sensitive adhesive 16 is a commercially available adhesive as known in the art. The preferred pressure sensitive adhesives are inherently tacky materials whose adhesive bonding power is related to the surface area of the adhesive. The pressure sensitive adhesives can be of the hot-melt or solvent-based type. Suitable polymeric pressure sensitive adhesives include polyacrylic or methacrylic acids and esters, copolymers of vinyl ethers, polyisobutylene and polybutenes, natural rubbers, synthetic polyisoprene, polyvinylesters, polychloroprene, polybutadiene, and copolymers of styrene and butadiene such as styrene-butadiene rubber (SBR).

Release sheet 18 is generally a flexible sheet material such as kraft paper, although other sheet materials may be used. Other suitable release sheets include, for example, plastic films and metal foils. The front face of release sheet 18 is coated with release layer 20 for releasably attaching release sheet 18 to substrate 14 via pressure sensitive adhesive 16. In preferred embodiments, release layer 20 is applied as a continuous and uniform coating which completely covers the front face of release sheet 18. Release sheet 20 is preferably a coating of a silicone resin or other suitable release material commonly used in the art. The release materials are compositions that do not have an affinity for the adhesive such that the adhesive coated substrate can be easily separated without pulling the adhesive from the substrate. Other release materials include, for example, waxy materials such as paraffin and high molecular weight fatty acids, UV-curable polymers, acrylic polymers, vinyl polymers and copolymers, fluorocarbon polymers such as polytetrafluoroethylene, hot-melt materials and solvent-based materials. Typically, release sheet 18 is a silicone treated paper.

The laminate or label assembly 12 shown in FIG. 2 is manufactured by standard coating and laminating procedures as known in the art. In one process, a continuous web of sheet material forming a release sheet 18 is passed through a coating apparatus to apply a continuous and uniform coating of a release material. The coating apparatus may be a coating knife, doctor blade, spray bath, roller or gravure press, depending on the coating material. The release material can be a hot-melt material, a solvent-based material, an emulsion applied material, or a 100% solids material. If the coating is other than a hot-melt, the web is passed through a suitable drying chamber to remove the solvent or vehicle and cure the material by heat or UV radiation. The release sheet 18 is coated with a pressure sensitive adhesive 16 using the coating apparatus previously mentioned or slot die coating to form a continuous and uniform coating of adhesive 16 on release liner 18. The adhesive coated web of release sheet 18 is then laminated to the substrate 14 by passing in an overlying manner between a pair of pressure rollers. The resulting label assembly or laminate 12 is stored as a continuous roll or die cut into discrete sheets. Now, this existing laminate or label assembly 12 shown in FIG. 2 can now be modified to selectively change the bonding power of adhesive 16.

First, the existing laminate 12 is delaminated to separate release sheet 18 from substrate 14 to expose release coating 20 and pressure sensitive adhesive 16. The delamination step may be performed manually or by a suitable apparatus. For example, substrate 14 and release sheet 18 can be peeled apart by separation rollers and stored on a spool or series of rollers until ready for relamination. Second, a discontinuous layer of a non-adhesive material 22 is positioned between substrate 14 and release sheet 18. Third, substrate 14 and release sheet 18 are then pressed together again over non-adhesive material 22 to relaminate the layers to form modified laminate 28 as shown in FIG. 4.

Non-adhesive material 22 is preferably applied as a uniform coating on either adhesive 16 of substrate 14 or release layer 20 of release sheet 18 in a discontinuous manner. As used herein, the term "discontinuous" refers to a coating that contains areas or fields 24 of non-adhesive material 22 separated by gaps or open spaces 26 that are void of non-adhesive material 22. The discontinuous coating of non-adhesive material 22 preferably has a regular uniform pattern or grid comprising distinct areas 24 of the non-adhesive material 22 and distinct void areas 26 to expose the pressure sensitive adhesive 16. In embodiments of the invention, the coating is uniform to the extent that a given area of the layer of non-adhesive material 22 has a predetermined weight or amount of the non-adhesive material 22.

Figure 3:
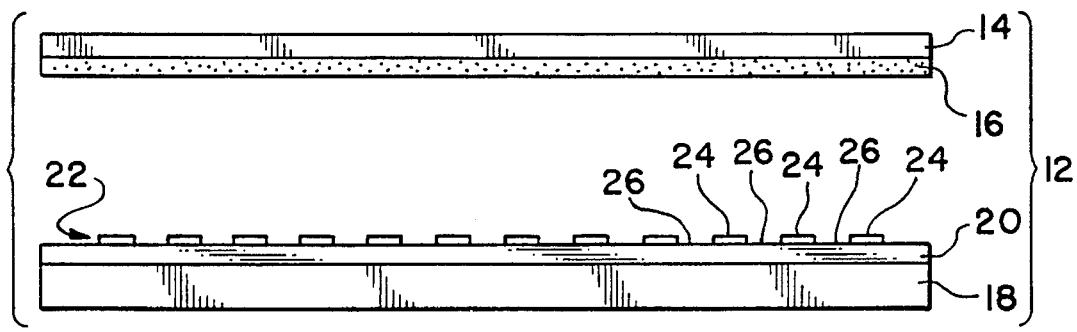
FIG. 3 is an exploded, side elevational view of the laminate of FIG. 2 after delaminating of the adhesive-backed label from the release sheet and application of a non-adhesive material to the release sheet.

In embodiments of the invention, the layer of non-adhesive material 22 is printed either directly on the layer of pressure sensitive adhesive 16 or the coating of release layer 20. For purposes of illustration, non-adhesive material 22 is shown in FIG. 3 as being printed directly on release layer 20. Non-adhesive material 22 is shown as raised ridges, although in practice, the thickness of non-adhesive material 22 is sufficiently thin so as not to interfere with the adhesive areas 24 bonding with the support surface. The layer of non-adhesive material 22 is applied by a suitable printing apparatus such as, for example, printing screen, gravure roll or printing plate.

Figure 4:
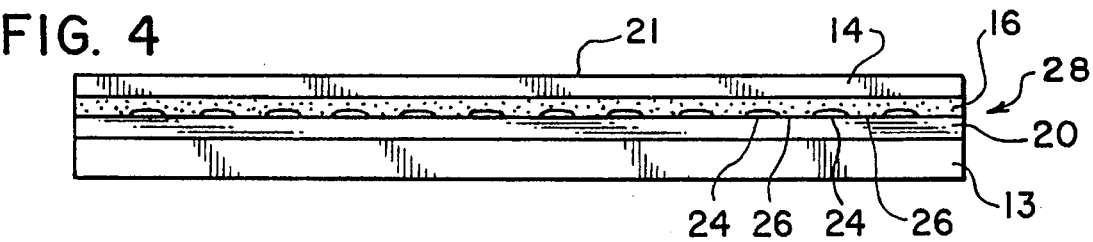
FIG. 4 is a side elevational view of the laminate of FIG. 3 after relamination of the adhesive-backed label with its modified release sheet.

After non-adhesive material 22 is printed on either pressure sensitive adhesive 16 or release layer 20, substrate 14 is relaminated onto release sheet 18 with non-adhesive material 22 positioned therebetween to produce a modified laminate 28 with modified adhesive properties of pressure sensitive adhesive 16 as shown in FIG. 4. Prior to relamination, non-adhesive material 22 is dried or cured as needed. For example, a solvent based varnish can be used for non-adhesive material 22, which would be dried before relamination by applying heated air or radiant heat to the layer. A UV-curable varnish can be used for non-adhesive material 22 which would be cured before relamination by applying UV radiation to the layer.

Figure 5:
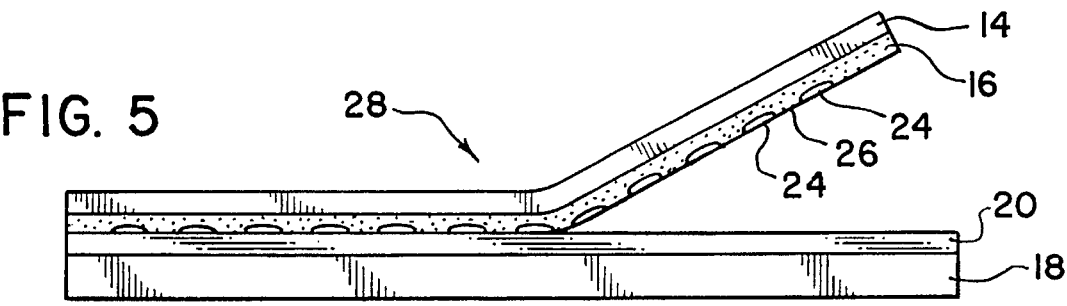
FIG. 5 is a side elevational view of the laminate after partial separation of the label from the release sheet to illustrate the non-adhesive material blocking a portion of the adhesive layer of the label.

Substrate 14 can then be peeled from release sheet 18 as shown in FIG. 5. Non-adhesive material 22 is carried on pressure sensitive adhesive 16 when release sheet 18 is separated from substrate 14. When non-adhesive material 22 is printed on release sheet 18, non-adhesive material 22 is transferred to pressure sensitive adhesive 16 by the relamination step and subsequent separation of release sheet 18.

The non-adhesive material 22 is a suitable non-tacky material that has an affinity for the pressure sensitive adhesive. Typically, non-adhesive material 22 is transparent, although suitable dyes or pigments may be added as desired. Suitable non-adhesive materials include a 100% solids coating such as a UV-cured varnish, a hot-melt material such as a non-pressure sensitive polymer, or a solvent-based material. One example of a suitable non-adhesive material is a vinyl copolymer or an acrylic resin-based varnish. The non-adhesive material 22 can be applied by an embossed printing roller as known in the art. The thickness of the layer non-adhesive material 22 is sufficient to cover and block the adhesive properties of pressure sensitive adhesive 16 without affecting the appearance of the finished or modified laminate 28.

Non-adhesive material 22, as shown in FIG. 6, covers a portion of pressure sensitive adhesive 16, thereby reducing the exposed surface area 26 of adhesive 16 available for bonding to a support surface. Non-adhesive material 22 functions as a cover-up and blocking material to reduce the overall adhesive bonding strength of pressure sensitive adhesive 16 on substrate 14 by breaking up the continuous coating of the pressure sensitive adhesive 16 into small isolated areas and reducing the overall tack of adhesive 16. Non-adhesive material 22 is preferably a non-tacky material that can be adhesively fixed to pressure sensitive adhesive 16 and is releasable from release sheet 18.

The adhesive bonding strength of pressure sensitive adhesive 16 on substrate 14 is proportional to the total surface area of adhesive 16 available for bonding to a support surface. The method of the invention allows selective modification of the adhesive bonding strength of the adhesive 16 on a premanufactured laminate 12 by controlling the surface area of the non-adhesive material 22 overlying adhesive 16. The amount of the non-adhesive material 22 inherently controls the exposed surface area of the adhesive 16, thereby modifying its bonding strength. Thus, as the surface area of the non-adhesive material 22 increases, the exposed surface area 26 and adhesive bond strength of pressure sensitive adhesive 16 both decrease. In this manner, the adhesive bond strength of substrate 14 can be selectively modified to accommodate the particular needs of the ultimate user.

The surface area of pressure sensitive adhesive 16 is typically reduced by about 50% to about 60% by the printing of the non-adhesive material 22. In embodiments of the invention, the surface area of pressure sensitive adhesive layer 16 may be reduced by about 10% to 70%. In further embodiments, the non-adhesive material is applied to cover about 45% to about 55% of the adhesive. Typically, the reduction of the adhesive bonding strength of the pressure sensitive adhesive is directly proportional to the surface area of the non-adhesive material 22. The actual surface area of the pressure sensitive adhesive 16 covered by the non-adhesive material 22 needed to achieve the desired release and adhesive bond strength of the adhesive will further depend on the particular non-adhesive material used, the adhesive composition, and the intended utility of the finished article by the ultimate user.

By applying the non-adhesive material 22 to cover up the pressure sensitive adhesive 16, the removable properties of substrate 14 are variable. The release sheet 18 can then be easily separated from substrate 14. Substrate 14 can be laminated onto a support surface and removed as necessary to reposition the substrate 14 on the support surface.

In the embodiment shown in FIG. 6, the non-adhesive material 22 comprises a plurality of lines 24 extending diagonally across substrate 14. The dimensions of lines 24 are exaggerated for purposes of illustration, and typically are thin lines of less than 2.0 mm. The width of lines 24 can be, for example, about 0.5–2.0 mm. The weight of the coating of the non-adhesive material 22 is dependent on the concentration of the non-adhesive material 22 and the adhesive bond strength of the adhesive 16. The weight of the non-adhesive material 22 may be, for example, 0.01–0.10 grams per square foot. The thickness, width and spacing of lines 24 determine the exposed surface area of pressure sensitive adhesive 16 and the adhesive bonding strength thereof. The resulting adhesive bonding strength of the adhesive 16 is also determined by the degree or scale of fineness of the pattern of the discontinuous layer of non-adhesive material 22. When the non-adhesive material 22 is applied as parallel lines, the layer may have, for example, about 30 to about 120 lines per inch. Although non-adhesive lines 24 are shown extending diagonally to the longitudinal dimension of substrate 14, the lines can be arranged in the longitudinal direction or in the transverse direction.

Non-adhesive layer 22 can be applied across the entire surface of substrate 14 or, alternatively, to a localized area. In the embodiment of FIG. 6, non-adhesive material 22 is applied in a localized area by spot or band printing to define a marginal area 32 free of the non-adhesive material 22. As shown, marginal area 32 extends the full length of one edge of substrate 14.

The non-adhesive material may be applied in a number of different discontinuous patterns. The actual printed pattern of the non-adhesive material 22 will affect the adhesive bond strength of the substrate 14. FIG. 7 illustrates an alternative printing pattern of the non-adhesive material 22 which defines a cross-hatch pattern of exposed adhesive material 43. FIG. 7 shows the pattern of non-adhesive coating on article or substrate 42 as a symmetrical series of circular dots or beads 40. Dots 40 are arranged in a plurality of rows with each row being staggered with respect to the adjacent row.

FIG. 8 shows a pattern similar to the pattern of FIG. 7, except that the non-adhesive material 49 is printed on the adhesive in a regular cross-hatch pattern to define a regular dot pattern of exposed adhesive 44 along a first part 48 of substrate 46, while the adhesive on the second part 50 of substrate 46 remains unchanged. In other words, a series of adhesive diamond-shaped dots 44 are formed on substrate 46 by applying a regular cross-hatch pattern of non-adhesive material 49 along first part 48 of substrate 46. The adhesive on the second part 50 remains unchanged. Thus, the label of FIG. 8 has an area of lesser bonding strength along first part 48 than along second part 50. Diamond-shaped dots 44 as shown are also arranged in staggered rows such that dots 44 are uniformly spaced and are of uniform size.

Although the dots of either non-adhesive material or adhesive material of FIGS. 7 and 8 are illustrated as being arranged in staggered rows, it is to be understood that the dots can be arranged in uniform columns and rows. The dots also can be of different size. For example, they can be alternating large and small dots, a waffle pattern or grid pattern, depending on the desired adhesive bond strength and removable properties. The non-adhesive or adhesive dots can be round, elliptical, rectangular, or any irregular shape.

The pattern, surface area and location of non-adhesive material 22 are selectively applied to the pressure sensitive adhesive 16 or to the release layer 20 and transferred to the adhesive 16 to vary the adhesive bonding and peel properties of the substrate 14.

In other embodiments (not shown), it may be desirable to apply the non-adhesive material 22 in a localized area, for example, along a corner or to allow the ultimate user to easily separate one corner from the release sheet or support surface. The separated corner can then be gripped by the user to peel the substrate from the support surface or release sheet. In further embodiments, the non-adhesive material can be selectively applied to different localized areas on the substrate such that each area has different adhesive bonding strengths.

By way of example shown in FIG. 9, the substrate 54 can be in the form of a label with first part 58 intended to be permanently fixed to a support surface and a second part 60 intended to be removably coupled to the support surface and the first part. The first and second parts 58 and 60 can be attached together by a frangible line such as perforations 62. The second removable part 60 can be printed with the non-adhesive material 64 to allow separation from the support surface. The second removable part 60 can further be divided into two or more areas of different adhesive bonding strength such as areas 65 and 66 which are separable by perforation line 67 as seen in FIG. 9. Area 65 has printed with more dots of non-adhesive material 64 than area 66 so that area 65 has a lower bonding strength than area 66.

In further embodiments, the non-adhesive material can be applied in one or more localized areas surrounded by a marginal edge free of the non-adhesive material. Accordingly, the article can include a marginal edge on each of the side edges. In still further embodiments, the non-adhesive material is applied in a number of localized spaced-apart areas on the article. For example, the surface of the pressure sensitive adhesive on the article can be divided into four quadrants, where each quadrant includes a localized area of the non-adhesive material separated by a marginal area free of the non-adhesive material. Each quadrant may be printed with the non-adhesive material, such that each quadrant has a different adhesive bond strength. Alternatively, the non-adhesive material can be applied around the perimeter of the adhesive surface.

In an alternative embodiment shown in FIG. 10, laminate 28 can be modified to further include a pressure sensitive adhesive layer 68 on the bottom face of release sheet 18. In this embodiment, laminate 28 can be attached to a support surface such as, for example, a blank business form. Substrate 14 can then be separated from release sheet 18 and applied to a suitable surface.

Although the invention has been described with a certain degree of particularity, it is understood that the present disclosure has been made only by way of example, and that numerous changes on the details of construction and the combination and arrangement of parts may be resorted to without departing from the spirit and scope of the convention. Thus, the scope of the invention should not be limited by the foregoing specification, but rather, only by the scope of the claims appended hereto.

What is claimed is:

1. A method of making a laminate, comprising the steps of:
   providing a substrate with a layer of a pressure sensitive adhesive and a release sheet releasably adhered to said pressure sensitive adhesive,
   separating said release sheet from said pressure sensitive adhesive on said substrate to expose a surface of said pressure sensitive adhesive on said substrate,
   applying a discontinuous layer of a non-adhesive material between said separated release sheet and substrate, and
   relaminating said release sheet to said exposed surface of said pressure sensitive adhesive on said substrate with said discontinuous layer of non-adhesive material therebetween to modify adhesive properties of said pressure sensitive adhesive on said substrate.

2. The method of claim 1, wherein said separating step comprises the step of
   peeling said release sheet from said substrate.

3. The method of claim 1, wherein the applying step is accomplished by
   applying said non-adhesive material layer directly on said pressure sensitive adhesive.

4. The method of claim 1, wherein the applying step is accomplished by
   applying said non-adhesive material layer on said release sheet.

5. The method of claim 1, wherein during the step of relaminating
   said non-adhesive material adheres to said pressure sensitive adhesive, thereby reducing the exposed surface area of said pressure sensitive adhesive.

6. The method of claim 1, wherein the applying step is accomplished by
   applying said discontinuous layer of non-adhesive material to form a plurality of spaced-apart lines of said non-adhesive material.

7. The method of claim 1, wherein the applying step is accomplished by
   applying said discontinuous layer of non-adhesive material to form a plurality of spaced-apart dots of said non-adhesive material.

8. The method of claim 1, wherein the applying step is accomplished by
   applying said discontinuous layer of non-adhesive material as a regular pattern of dots of said non-adhesive material to define a cross-hatch pattern of exposed adhesive material.

9. The method of claim 8, wherein
   said dots of non-adhesive material can be round, rectangular or of irregular shape.

10. The method of claim 8, wherein
    said discontinuous layer of non-adhesive material is applied to a specified area of said adhesive on said substrate to provide areas of greater and lesser bonding strength on said substrate.

11. The method of claim 1, wherein the applying step is accomplished by
    applying a cross-hatch pattern of non-adhesive material to define a regular dot pattern of exposed adhesive.

12. The method of claim 11, wherein
    said dots of exposed adhesive defined by said cross-hatch pattern of said non-adhesive material can be round, rectangular or of irregular shape.

13. The method of claim 11, wherein
    said discontinuous layer of non-adhesive material is applied to a specified area of said adhesive on said substrate to provide areas of greater and lesser bonding strength on said substrate.

14. The method of claim 1, wherein the applying step includes
    using a varnish for said non-adhesive material.

15. The method of claim 14, wherein
    said varnish is a UV-curable varnish, and said method comprises applying UV light to said discontinuous layer to cure said varnish.

16. The method of claim 1, wherein the applying step includes
    using a hot-melt material or a solvent-based material for said non-adhesive.

17. The method of claim 1, wherein
    said substrate is a pressure sensitive label.

18. The method of claim 1, wherein
    said release sheet is a silicone treated paper.

19. The method of claim 1, wherein
    said release sheet comprises a coating of an adhesive release material.

20. The method of claim 19, wherein
    said release material is a silicone or wax material.

21. A method of modifying the adhesive properties of a label having a continuous layer of a pressure sensitive adhesive on its inner surface, and a release sheet with an inner surface adhered to said label by said pressure sensitive adhesive, comprising the steps of:
    delaminating said label with said pressure sensitive adhesive from said release sheet to expose its inner surfaces,
    applying a discontinuous layer of a non-adhesive material on one of said inner surfaces of said label and said release sheet, and
    relaminating said inner surface of said label to said inner surface of said release sheet to form a modified label assembly with said non-adhesive material contacting said adhesive to reduce the adhesive binding properties of said label.

22. The method of claim 21, wherein the step of applying said non-adhesive material is accomplished by printing a discontinuous pattern on said release sheet and transferring said non-adhesive material to said adhesive layer so that said non-adhesive material remains on said adhesive layer upon separation of said release sheet from said label.

23. The method of claim 21, wherein the step of applying said non-adhesive material is accomplished by printing a discontinuous pattern of dots on said adhesive layer.

24. The method of claim 21, wherein said release sheet has a release coating on its inner surface, and has an outer surface with an adhesive coating.

25. The method of claim 21, wherein the step of applying said non-adhesive material includes forming a plurality of spaced-apart dots of said non-adhesive material.

26. The method of claim 21, wherein the step of applying said non-adhesive material includes forming a plurality of spaced-apart lines of said non-adhesive material.

27. The method of claim 21, wherein the applying step is accomplished by applying said discontinuous layer of non-adhesive material as a regular pattern of dots of said non-adhesive material to define a cross-hatch pattern of exposed adhesive material.

28. The method claim 27, wherein said discontinuous layer of non-adhesive material is applied to a specified area of said adhesive on said label to provide areas of greater and lesser bonding strength on said label.

29. The method of claim 21, wherein the applying step is accomplished by applying a cross-hatch pattern of non-adhesive material to define a regular dot pattern of exposed adhesive.

30. The method of claim 29, wherein said discontinuous layer of non-adhesive material is applied to a specified area of said adhesive on said label to provide areas of greater and lesser bonding strength on said label.

\* \* \* \* \*